Nov. 24, 1925.  
V. DURBIN  
1,562,545  
APPARATUS FOR TESTING TELEPHONE RECEIVERS  
Filed April 13, 1923    3 Sheets-Sheet 1
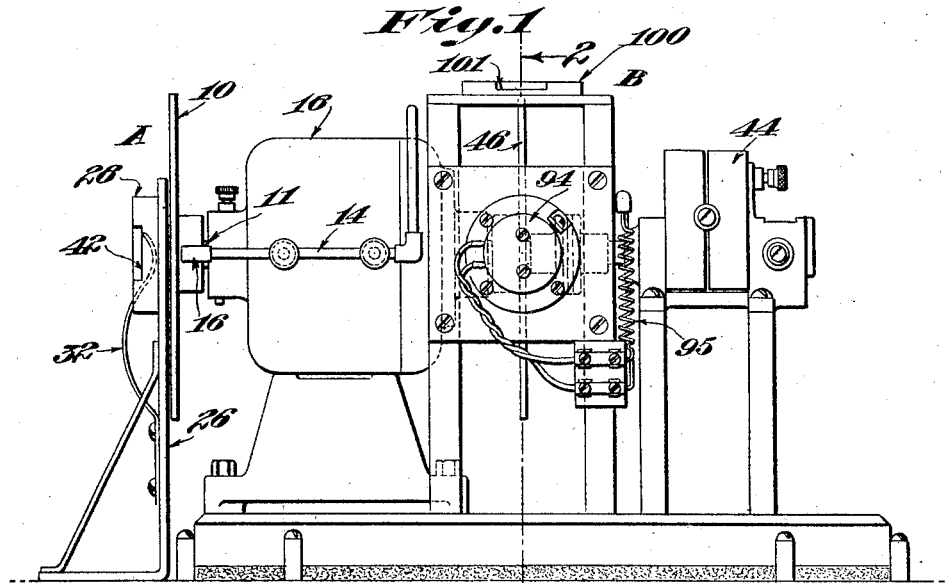
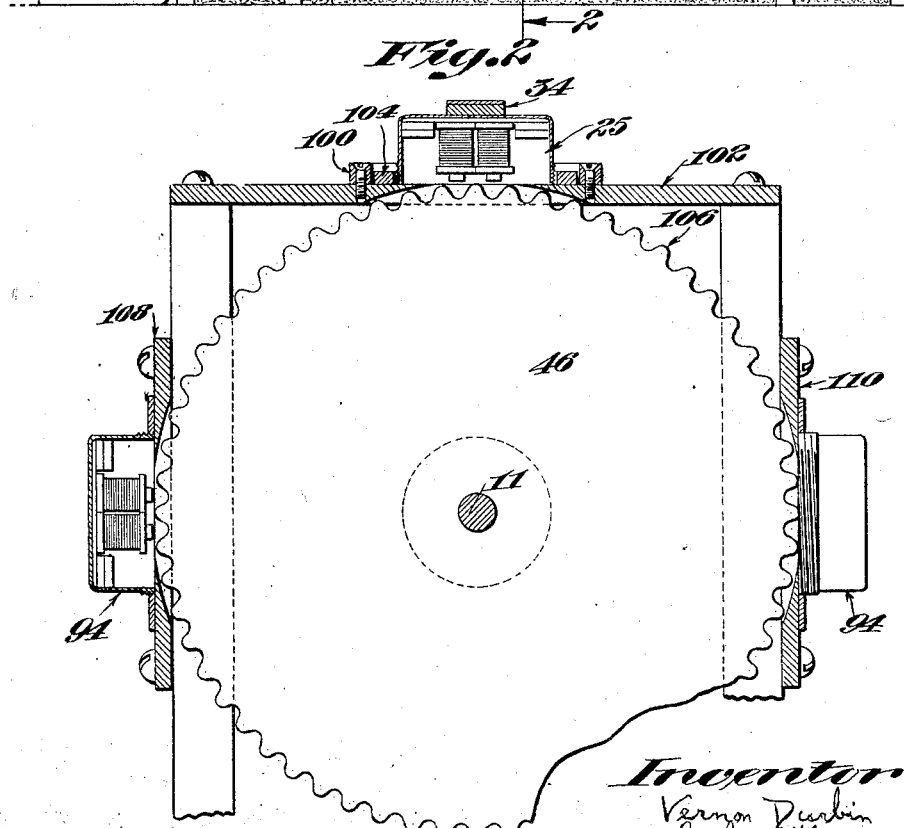

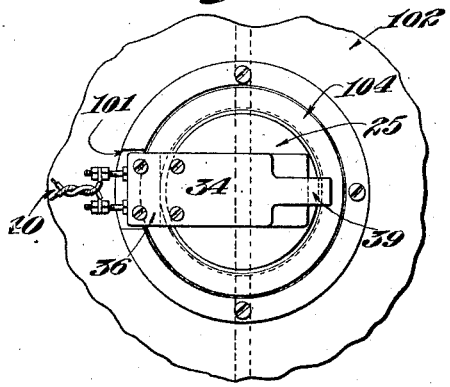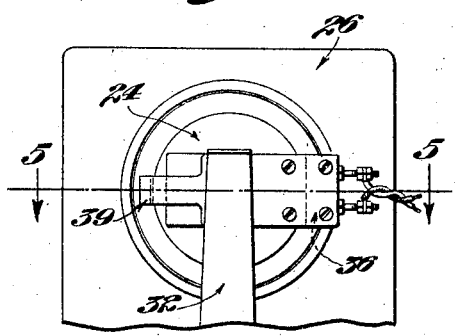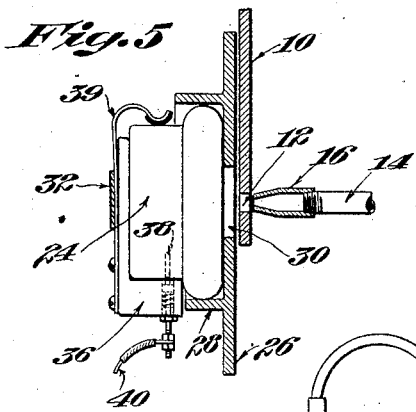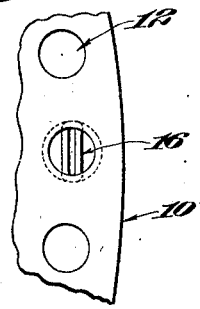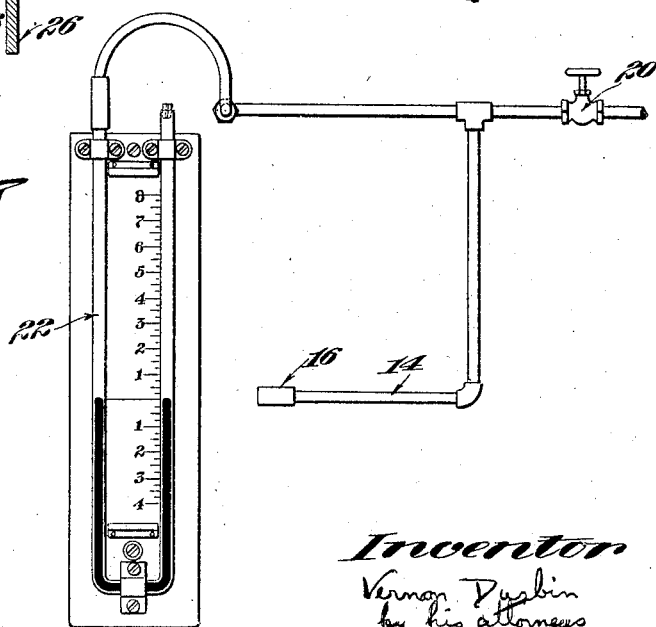

Nov. 24, 1925.  
V. DURBIN  
1,562,545  
APPARATUS FOR TESTING TELEPHONE RECEIVERS  
Filed April 13, 1923  
3 Sheets-Sheet 3

*Fig. 8*

Patented Nov. 24, 1925.

1,562,545

UNITED STATES PATENT OFFICE.

VERNON DURBIN, OF NEWTON, MASSACHUSETTS, ASSIGNOR TO THE HOLTZER-CABOT ELECTRIC COMPANY, OF ROXBURY, MASSACHUSETTS, A CORPORATION OF MASSACHUSETTS.

APPARATUS FOR TESTING TELEPHONE RECEIVERS.

Application filed April 13, 1923. Serial No. 631,818.

*To all whom it may concern:*

Be it known that I, VERNON DURBIN, a citizen of the United States, residing at Newton, in the County of Middlesex and State of Massachusetts, have invented certain new and useful Improvements in Apparatus for Testing Telephone Receivers; and I do hereby declare the following to be a full, clear, and exact description of the invention, such as will enable others skilled in the art to which it appertains to make and use the same.

The present invention relates to apparatus for testing telephone receivers and is more particularly concerned with apparatus for testing telephone receivers of the type disclosed in the co-pending application of Durbin, Serial No. 611,893, filed January 10, 1923.

The object of the present invention is to provide apparatus for testing telephone receivers whereby the characteristics of the receivers may be determined with any desired degree of accuracy and in a shorter time than that required for previously existing methods.

With this object in view the present invention consists of the apparatus for testing telephone receivers hereinafter described and particularly defined in the claims.

In the accompanying drawings Figure 1 is an elevation of an apparatus for testing telephone receivers embodying the several features of the invention; Fig. 2 is a section on line 2—2 of Fig. 1, showing that part of the apparatus for use in determining the magnetic characteristics of the receiver without diaphragm or cap; Fig. 3 is a detail plan view showing a receiver in position relative to the apparatus shown in Fig. 2; Fig. 4 is a rear view of the apparatus for testing the completed receivers; Fig. 5 is a section on line 5—5 of Fig. 4; Fig. 6 is a detail showing the means for producing sound energy; Fig. 7 is a detail showing the air pressure measuring device; and Fig. 8 is a diagram of electrical connections of the apparatus.

The co-pending application, above referred to, discloses an improved method by which the characteristics of a telephone receiver may be completely determined with at least commercial accuracy in approximately one-half minute. The method briefly consists in impressing a fixed amount of sound energy upon the diaphragm of the receiver over a range of frequencies and measuring the electrical output of the receiver at each frequency. The amount of sound energy thus impressed upon the diaphragm is not necessarily determinate but must remain substantially constant throughout the entire testing operation, a condition which is easily fulfilled in practice. The electrical output is measured by any of the well-known means and from these observations the efficiency, resonance characteristics and other desired data may be computed. In the commercial testing of receivers, the improved method also provides for the convenient and accurate testing of the properties of the receiver before the diaphragm and cap are assembled thereon, in order to detect any receivers which have defective windings, improperly spaced cores or imperfect magnets before subjecting the receivers to the final test.

The illustrated embodiment of the invention comprises a system indicated generally at A for testing the completed receiver, and a second system indicated generally at B for the purpose of testing the magnetic characteristics before the diaphragm and cap are assembled thereon. The system A utilizes, as its source of sound energy, a siren consisting of a rotating disk 10 mounted on a shaft 11 provided with a plurality of holes 12 near its periphery against which a blast of air is directed through a tube 14. The holes 12 are preferably circular and regularly spaced, the distance between adjacent holes being approximately equal to the diameter of the holes themselves in order that the emitted note may not vary greatly from a sine wave. Although the number of holes in the disk is immaterial within reasonable limits, it is preferred to employ a disk having 60 equally spaced holes in order that the speed of the disk in revolutions per minute shall be numerically equal to the frequency of the note in cycles per second. The tube 14 through which the air passes is provided with a nozzle 16 for directing the blast against the holes in the siren disk. This nozzle is provided with an elongated orifice extending in the direction of motion of the disk, as indicated in Fig. 6. It has been found that, with such a nozzle, the note generated by the siren is quite pure and fairly free from higher harmonics. The disk is rotated by a motor 18 which is preferably of the direct current type having a speed control consisting of a rheostat in the armature circuit by which the operator may conveniently vary the speed over a considerable range. The pipe 14 connects with any convenient compressed air supply through a valve 20 by which the pressure of the air that is blown against the disk may be regulated. The pressure is measured by a mercury manometer 22 or any other suitable pressure measuring device, as indicated in Fig. 7. The pressure, as indicated by the manometer, should be kept as nearly constant as possible throughout the entire test of the receiver in order that the sound energy which is impressed upon the receiver at different frequencies may be held substantially constant. The receiver 24 which is under test is illustrated as one of a pair usually employed in radio head sets but the apparatus may obviously be used for testing receivers of any type. As indicated in Figs. 4 and 5, the receiver is maintained a fixed distance from the source of sound energy by means of a bracket 26 provided with a positioning ring 28 within which the receiver snugly fits. The apparatus may obviously be used to accomodate receivers of any size by providing suitable spacing rings between the receiver 24 and the positioning ring 28, in such a manner that the center of the diaphragm is always maintained at the center of the positioning ring. The bracket 26 is provided with an opening 30 in alignment with the center of the diaphragm of the receiver and also with the center of the air blast, in order that the note generated by the siren may be impressed directly on the diaphragm. The receivers are held in place by a suitable flat spring 32 attached to the bracket. The electrical connections to the receiver are conveniently made through a clamping device which is provided with a projecting lug 36 having a pair of yielding contacts 38 which are adapted to be forced into corresponding openings in the receiver to make contact therewith. A curved spring member 39 engages the side of the receiver opposite from the contacts and holds it firmly. In order to allow of accurate positioning of the receiver, the positioning ring 28 is provided with a notch 42 into which the lug 36 fits when the receiver is in place. The contacts 38 connect by wires 40 with a plug 41 of the usual form by which the receiver may be connected with suitable electrical measuring instruments to determine the amount of energy generated in the receiver by the impulses impressed on the diaphragm through the action of the siren.

It will be obvious that the pitch or frequency of the note generated by the siren will depend upon the speed of the motor. The speed is conveniently measured by any form of tachometer, indicated as a magneto 44 which is connected directly with a voltmeter 45 (see Fig. 8) the reading of the voltmeter being proportional to the speed of the motor.

The electrical energy generated by the receivers under test may be measured by any suitable alternating current measuring apparatus but since the generated voltages are rather small, it is desirable first to amplify and then rectify them, thereafter taking the actual readings of the direct current instrument. As indicated in Fig. 8, the plug 41 which is connected with the receiver 24 which is under test is inserted into a suitable jack 48 which connects through a double-pole switch 50 to the measuring system. The amplifying and rectifying apparatus consists of an amplifier tube 52 of the thermionic type, the impulses from the receiver being impressed directly upon the grid of the tube. The plate current of the tube passes through a transformer 54 and is impressed upon the grid of a rectifier tube 56. The plate circuits of both tubes are energized by plate batteries 58 and the filaments of the tubes are heated by filament batteries 60 and 62 through rheostats 64 and 66, respectively. The plate circuits of the tubes connect with the filament circuits through potentiometers 68 and 70. The plate circuit of tube 56 includes a resistance 72 and a direct current measuring instrument indicated as an ammeter at 74. The connections from switch 50 to the indicating apparatus conveniently include a switch indicated generally at 76, which includes an operating button 78, two pairs of movable contacts 80 and four pairs of fixed contacts 82. Both pairs of movable contacts 80 move up and down together through the action of the button 78. It will be seen, from inspection of the connections, that when the movable contacts are moved up, the impulses from the receiver 24 are impressed upon the grid of tube 52, the amplified impluses in the plate circuit passing through transformer 54 and being thereafter rectfied by means of tube 56, as above described When the movable contacts 80 are moved down, the amplifier tube is cut out of circuit and the impulses are impressed upon tube 56 where they are rectified without amplification. This provision for eliminating the amplifier is useful when receivers of unusual strength are being tested or when it is desirable to test a receiver under an increased air pressure to determine its action under overload conditions. The grid circuits of the tubes include grid batteries 84 and 86 by which the operating characteristics of the tubes are controlled in a manner to obtain maximum amplification from tube 52 and maximum rectification from tube 56. The filaments of the two tubes connect through switches 88 and 90 with a suitable voltmeter 92 by which the voltage across either filament may be measured. A plurality of standard receivers 94 are connected by leads 95 into the input circuit through switches 96 for a purpose to be presently described. When the movable contacts of the switch 96 are moved up, the standard receiver feeds its energy directly into the input circuit and when the contacts are moved down, the receiver is connected with a jack 98 into which a receiver may be plugged to give an auditory sensation in the usual manner.

The system B for the testing of receivers before assembly of the diaphragm and cap thereon includes the disk 46 mounted upon the motor shaft 11. A receiver 25 which is under test is mounted within a positioning ring 100 upon a fixed plate 102 into which the disk 46 extends, as clearly indicated in Fig. 2. A spacing ring 104 is provided between the receiver on the positioning ring 100 in case the receiver is too small to fit snugly within the ring 100. The disk 46 is constructed of magnetic material such as soft iron and is provided with a series of 60 teeth 106, the distance between adjacent teeth being substantially equal to the distance between the core centers of the receiver magnets. The rotation of the disk beneath the receiver 25 causes a changing magnetic flux to pass through the magnets of the receiver, thereby generating in the windings an electrical voltage which may be amplified, rectified and thereafter measured by instrument 74, as in the previously described test. During this test, the receiver is mounted in the clamp 34, the lug 36 resting in a notch 101 of the positioning ring in order that the magnets may be properly positioned with both cores lying in the plane of the disk 46. The use of the clamp in this connection is an important feature, since it will be appreciated that maximum energy is generated in the receiver windings only when the receiver is placed in proper angular position with respect to the disk.

The disk 46 is also utilized to excite the standard receivers 94 which are secured in place on vertical plates 108 and 110 in such a manner that voltages may be generated therein in the same manner as in the receiver 25. This construction affords a convenient means for calibrating the measuring system. It will be apparent that the conditions existing in the vacuum tubes and other parts of the measuring circuit should be maintained as nearly constant as possible during the test, otherwise faulty readings will be given by the instrument 74. The variable factors such as the filament voltages and the adjustments of potentiometers 68 and 70 should be carefully maintained at constant values. The most convenient way of carrying this out is to place one of the standard receivers in the circuit and rotate the disk 46 at a predetermined velocity during which the instrument 74 should come to a known reading. If such is not the case, the various apparatus in the tube circuits may be adjusted until the proper reading is secured. Either of the standard receivers may be cut into circuit by operating its corresponding switch 96.

The various steps incident to the commercial testing of a receiver are explained in the co-pending method application, but will be briefly outlined here. The motor is first rotated at a predetermined velocity, as indicated by the voltmeter 45. One of the standard receivers 95 is cut into circuit by means of its switch 96 and the resistances 64 and 66 and the potentiometers 68 and 70 are adjusted until the indicating instrument 74 comes to its proper predetermined reading. The receiver to be tested is then sprung into clamp 34 and placed within the positioning ring 101 above the disk 48, the plug 41 being inserted in the jack 48. The switch 96 is then opened and the receiver 24 is placed in circuit by closing switch 50. The reading of ammeter 74 should then come to approximately the same value as that obtained from the standard receiver, within certain prescribed limits. The receiver is then removed from system B and its diaphragm and cap assembled thereon to form the completed receiver. The entire assembly including clamp 34 is removed to system A for the sound test, the receiver being placed in the positioning ring 28, as above described. For a quick test the motor is speeded up to the maximum desired speed conveniently corresponding to a note of between 4,000 and 5,000 cycles and then allowed to gradually slow down, the indications of the instruments 45 and 74 being simultaneously taken at a number of different speeds. During this test the air blast is turned on and the reading of the manometer kept as nearly constant as possible. This method is very fast, the entire test for each receiver usually averaging about one-half minute. Results of even greater accuracy may be obtained by allowing the motor to come to constant speed before taking each reading, but this method takes a slightly longer time.

While it is preferred to employ the specific construction and arrangement of parts shown and described, it will be understood that this construction and arrangement is not essential except so far as specified in the claims and may be changed or modified without departing from the broader features of the invention.

The invention having been described, what is claimed is:

1. An apparatus for testing telephone receivers having, in combination, a rotatable toothed disk of magnetic material, means for positioning a receiver without diaphragm or cap at a fixed distance from the disk to generate an electrical voltage in the windings, means for maintaining the receiver in fixed angular position with respect to the disk, and means for measuring the electrical output of the receiver.

2. An apparatus for testing telephone receivers having, in combination, a disk of magnetic material having an irregular periphery, a plate for supporting a telephone receiver without diaphragm or cap in fixed relation with respect to the disk, a positioning ring enclosing the receiver and provided with a notch, a clamp engaging the receiver and provided with a lug adapted to engage the notch in the positioning ring to hold the receiver in fixed angular position with respect to the disk, means for rotating the disk, and means for measuring the electrical output of the receiver generated by the rotation of the disk.

3. An apparatus for testing telephone receivers having, in combination, a siren disk, a bracket for holding the completed telephone receiver at a fixed distance from the disk, and means for directing a blast of air against the disk including an air pipe and a nozzle provided with an elongated orifice.

4. An apparatus for testing telephone receivers having, in combination, means for determining the magnetic characteristics of the receiver before assembling the cap and diaphragm thereon, means including a source of sound energy for testing the completed receiver, a clamp secured to the receiver during both tests, electrical contacts within the clamp, means for measuring the electrical output of the receiver during each test, and connections from the contacts to the electrical measuring means.

5. An apparatus for testing telephone receivers having, in combination, a rotatable shaft, a toothed disk of magnetic material mounted upon the shaft, means for positioning the windings of a receiver with relation to the toothed disk for generating an electrical voltage in the windings, means mounted upon the shaft for generating sound energy, means for holding the completed receiver at a fixed distance from the source of sound energy to generate a voltage in the receiver, electric apparatus for measuring the electrical output of the receiver during each test, and a clamp within which the receiver is received during each testing operation.

6. An apparatus for testing telephone receivers having, in combination, a toothed disk of magnetic material, means for mounting a telephone receiver before assembly of the cap and diaphragm thereon in fixed position relatively to the disk to generate in the windings an electrical voltage, a rotatable shaft upon which the disk is mounted, a siren disk mounted upon the shaft, means for blowing a current of air against the siren disk to generate a musical note, means for holding the receiver at a fixed distance from the siren disk, a clamp in which the receiver is mounted during both testing operations, electrical measuring apparatus, and connections from the clamp to the measuring apparatus for determining the electrical output of the receiver during each test.

7. An apparatus for testing telephone receivers having, in combination, a rotatable toothed disk of magnetic material, a positioning ring above the disk in which the windings of a receiver are adapted to be received, the positioning ring being provided with a notch, a clamp for holding the receiver provided with a lug engaging the notch to hold the windings in correct angular position with respect to the disk, a rotatable siren disk, means for holding the completed receiver, together with the clamp, at a fixed distance from the siren disk, electrical measuring apparatus, and connections from the clamp to the measuring apparatus to measure the electrical output of the receiver during each testing operation.

8. An apparatus for testing telephone receivers having, in combination, a motor, a shaft rotatable by the motor, means for varying the speed of the motor, a toothed disk of magnetic material and a siren disk mounted upon the shaft, a positioning ring for holding the windings of a receiver above the disk of magnetic material, a bracket for holding the completed receiver at a fixed distance from the siren disk, means for generating a musical note from the siren disk, a clamp in which the receiver is mounted during each test constructed and arranged to allow proper angular positioning of the receiver with respect to each disk, electrical measuring apparatus and electrical connections from the clamp to the measuring apparatus for measuring the electrical output of the receiver during each testing operation.

9. An apparatus for testing telephone receivers having, in combination, a toothed disk of magnetic material, means including a positioning ring provided with a notch for holding the receiver without diaphragm or cap in fixed position with respect to the disk, a siren disk, means including a second positioning ring for holding the completed receiver in fixed position with respect to the siren disk, a clamp provided with a lug adapted to engage the notch in the first positioning ring to hold the receiver in fixed angular position with respect to the toothed disk, and means for measuring the electrical output of the receiver generated by the rotation of each disk.

10. An apparatus for testing telephone receivers having, in combination, means for generating sound energy of a constant value and at different frequencies, means for placing a telephone receiver in fixed position adjacent to the sound generating means, electrical apparatus for measuring the electrical output of the receiver, a standard receiver, means for generating electrical voltages in the standard receiver, and connections between the standard receiver and the electrical measuring apparatus for calibrating the latter.

11. An apparatus for testing telephone receivers having, in combination, a toothed disk of magnetic material, means for positioning a telephone receiver with respect to the toothed disk in such a manner that rotation of the disk generates an electrical voltage in the receiver, means for measuring the electrical output of the receiver, and a standard receiver of known characteristics cooperating with the toothed disk and connected with the measuring means for calibrating the same when the disk is rotated at a predetermined velocity.

12. An apparatus for testing telephone receivers having, in combination, a toothed disk of magnetic material, a standard receiver of known characteristics supported in fixed relation to the toothed disk, means for generating a voltage in the windings of a receiver under test, measuring apparatus for measuring the electrical energy generated in the windings, and means for connecting the standard receiver with the measuring apparatus for calibrating the latter.

13. An apparatus for testing telephone receivers having, in combination, a toothed disk of magnetic material, a siren disk, means for supporting the receiver to be tested without diaphragm or cap at a fixed distance from the toothed disk to generate a voltage in the windings, means for supporting the completed receiver at a fixed distance from the siren disk, means for generating a musical note from the siren disk, means for measuring the electrical energy generated in the windings during each test, a standard receiver having its windings mounted in fixed relation to the toothed disk, and means for connecting the standard receiver to the measuring apparatus for calibrating the latter.

VERNON DURBIN.